Patented Mar. 25, 1947

2,417,843

UNITED STATES PATENT OFFICE 2,417,843

DRYING OF MOIST FOOD PRODUCTS

Robert M. Schaffner, Chicago, Ill., assignor to The Guardite Corporation, a corporation of Illinois No Drawing. Application May 30, 1944, Serial No. 538,091

4 Claims. (Cl. 99—204)

This invention relates to the drying of moist food products and more particularly to the drying of natural moist fresh food products.

The step of blanching fresh food products before drying has heretofore been suggested. It has, however, been the practice to maintain as low a blanching temperature as possible in order to preserve the structure of the article undergoing blanching, to prevent it from losing its power of rehydration after drying, and to avoid destruction of heat-sensitive ingredients.

I have now discovered that with a predetermined drying cycle, particularly a vacuum drying cycle in the substantial absence of air, the final moisture content of the food product will be lower, the higher the temperature at which the blanching or precooking is accomplished. Strangely enough this is independent of the heat input. That is, using a given drying system, a given amount of heat energy put into the system as radiant energy and as superheated steam, more drying will be accomplished if the product has been precooked or blanched at an advanced temperature than if it had been precooked or blanched at a lower temperature.

Conversely, with a given drying cycle, the final moisture content may be controlled or regulated by the character of the pretreatment.

The invention is preferably accomplished in an apparatus of the form described in Heineman application, Serial No. 520,773, filed February 2, 1944, and Baer application, Serial No. 524,177, filed February 28, 1944. In such a system the air is removed from the product by imposing a vacuum and substituting an atmosphere of steam at low pressure. The pressure of the steam is raised to increase the temperature of the product and accomplish the precooking or blanching, the pressure is then quickly lowered to cool the product, after which the material is introduced into a drying zone under subatmospheric pressure wherein it is subject to intense radiant heat. The drying zone is elongated and the product is passed progressively through it. The radiant heat is produced by steam coils surrounding the product and close to it, and the temperature of these coils varies through the drying zone. In the beginning the temperature of the coils is comparatively high and decreases progressively. For example, a suitable temperature at the beginning of the dryer is 307° F. for the heating surface which progressively decreases to 240° F. by the middle of the drying zone and is held at about 228° F. through the latter 40% of the drying zone. In addition, superheated steam is introduced at the beginning and end of the drying zone and is exhausted at the middle.

In carrying out the present process the raw or partially cooked vegetable or meat is loaded on drying trays and placed in the vacuum blancher or cooker. This chamber is evacuated to remove substantially all air, as for example by lowering the pressure below ½ inch mercury in order to produce an atmosphere of steam. Steam is then admitted to the chamber to raise the temperature of the product to from 160° F. to 250° F. The particular temperature employed depends upon the final moisture content desired as well as the precise drying cycle employed. In general, however, it is desired to dry the product to as low a moisture content as is possible with a predetermined economical drying cycle. The precooking treatment, therefore, under normal circumstances will be at the highest temperature compatible with proper structure in the product upon reconstitution. I have found that the limiting factor is a tendency to produce mushiness and the cooking or blanching is stopped at a point where mushiness does not result upon reconstitution of the dried product.

Mushiness may also be defined as lack of structural character, but is perhaps most aptly defined as a condition of edibility. In other words, precooking or blanching is stopped at a point which is ultimately to be reached upon final cooking.

The following examples show the effect of varying blanching temperatures on potatoes. In all cases the following drying cycle was employed at a pressure of approximately 57 mm.

| Minutes of exposure | 36 | 36 | 18 | 36 | 36 |
|---|---|---|---|---|---|
| Radiant heat surface temp. ° F | 307 | 259 | 240 | 228 | 219 |

In all cases the tray loading was 1.4 lbs. per square foot and the blanching time was 2 minutes at the maximum temperature, the product being raised to that temperature as rapidly as practicable. At a maximum blanching temperature of 229° F. the final moisture content was 6.3%;

when the blanching temperature was 219° F. the final moisture content was 7.6%; and when it was 205° F. the final moisture content was 8.3%.

In another example the following drying cycle was employed:

Minutes of exposure_____ 36  36  18  72
Radiant heat surface temp.
  °F. _____ 307 259 240 228

The tray loadings and the blanching times were the same and the results were as follows:

| Maximum Blanching Temperature | Final Moisture Content |
|---|---|
| 229° F. | 2.9% |
| 219° F. | 5.2% |
| 204° F. | 8.3% |

In each of the above instances the chamber was evacuated again to about ½ inch of mercury absolute after completion of blanching and the product then transferred to the vacuum dryer. To some extent the time and the temperature are dependent variables. Increasing the time will permit decreasing the temperature of blanching but it is usually preferred to blanch for as short a time as possible.

The foregoing detailed description has been given for clearness of understanding only, and no unnecessary limitations should be understood therefrom.

What I claim as new, and desire to secure by Letters Patent, is:

1. In the drying of uncooked potatoes to remove moisture naturally contained therein, the step of blanching the potatoes before drying at a temperature of about 229° F. for about 2 minutes, and then drying in an atmosphere of superheated steam while subject to intense radiant heat, whereby on a predetermined drying cycle the product will acquire a minimum moisture content.

2. In the drying of an uncooked moisture-containing food product to remove moisture naturally contained therein, the step of blanching the product before drying at a temperature of from 160° F. to 250° F. for a time sufficient to precook the food product short of the point of disintegration which is ultimately to be reached on final cooking, and then drying under vacuum in an atmosphere of superheated steam while subject to intense radiant energy, whereby on a predetermined drying cycle the product will acquire a minimum moisture content.

3. The method as set forth in claim 1, in which the blanching is carried out in an atmosphere of steam substantially free from oxygen.

4. The method as set forth in claim 2, in which the product is potatoes.

ROBERT M. SCHAFFNER.

REFERENCES CITED

The following references are of record in the file of this patent:

UNITED STATES PATENTS

| Number | Name | Date |
|---|---|---|
| 109,068 | Smith | Nov. 8, 1870 |
| 1,372,112 | Wittenberg | Mar. 22, 1921 |

OTHER REFERENCES

Commercial Fruit and Vegetable Products, by Cruess, 1924, McGraw-Hill Co., N. Y. C., page 394. (Copy in Div. 63, U. S. Patent Office.)

Principles of Fruit Preservation, by Morris, 1933, Chapman & Hall, Eng., pages 83 and 84. (Copy in Div. 63, U. S. Patent Office.)